(12) United States Patent
Ibuki et al.

(10) Patent No.: US 7,181,471 B1
(45) Date of Patent: Feb. 20, 2007

(54) FACT DATA UNIFYING METHOD AND APPARATUS

(75) Inventors: Jun Ibuki, Kawasaki (JP); Ryo Ochitani, Kawasaki (JP); Fumihito Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1003 days.

(21) Appl. No.: 09/669,897

(22) Filed: Sep. 27, 2000

(30) Foreign Application Priority Data

Nov. 1, 1999 (JP) .................................. 11-310766

(51) Int. Cl.
*G06F 12/00* (2006.01)
*G06F 7/00* (2006.01)

(52) U.S. Cl. ........................................ 707/201; 707/100

(58) Field of Classification Search .................... 707/3, 707/10, 102, 201, 100, 204; 715/530; 714/15
See application file for complete search history.

(56) References Cited

U.S. PATENT DOCUMENTS

| | | | |
|---|---|---|---|
| 6,081,811 A * | 6/2000 | Nilsson ...................... 707/201 |
| 6,148,312 A * | 11/2000 | Paik et al. ................... 715/530 |
| 6,240,416 B1 * | 5/2001 | Immon et al. ................ 707/10 |
| 6,505,219 B1 * | 1/2003 | MacLean et al. ........... 715/530 |
| 6,604,110 B1 * | 8/2003 | Savage et al. .............. 707/102 |

\* cited by examiner

*Primary Examiner*—Sam Rimell
(74) *Attorney, Agent, or Firm*—Staas & Halsey LLP

(57) ABSTRACT

A data extracting unit extracts from a text fact data stipulated by a combination of a target object, an attribute name, and an attribute value. A data aggregating unit groups data similar to the extracted fact data throughout the text, and aggregates the number of occurrences. An inconsistency detecting unit detects an inconsistent data group which cannot be consistent by scanning a data set aggregated by the data aggregating unit. A correctness/incorrectness determining unit determines which data is correct within the inconsistent data group. A final data integrating unit integrates and outputs correct data. Additionally, the degree of reliability is assigned to fact data when the fact data is extracted from a text, and also a correctness/incorrectness determination of each data within a data group can be made by using the degree of reliability assigned to the fact data.

8 Claims, 20 Drawing Sheets

EXAMPLE OF CORRESPONDENCE TABLE

FIG. 1A

[EXPRESSION FORMAT] *2 IS ASSIGNED AS PRESIDENT OF *1

EXTRACTED DATA

FIG. 1B

| TARGET OBJECT VALUE | ATTRIBUTE NAME | ATTRIBUTE |
|---|---|---|
| *1 | REPRESENTATIVE | *2 |

PROCESS EXAMPLE

FIG. 1C

[INPUT TEXT]
PERSON D (MATCHING *2) IS ASSIGNED AS NEW PRESIDENT OF JOINT COMPANY C (MATCHING *1) ESTABLISHED BY COMPANIES A AND B

EXTRACTED DATA

FIG. 1D

| TARGET OBJECT VALUE | ATTRIBUTE NAME | ATTRIBUTE |
|---|---|---|
| COMPANY C | REPRESENTATIVE | PERSON D |

FIG. 5A

OUTPUT EXAMPLE OF DATA EXTRACTING UNIT

| TARGET OBJECT | ATTRIBUTE NAME | ATTRIBUTE VALUE |
|---|---|---|
| COMPANY A | REPRESENTATIVE | B |
| COMPANY F | REPRESENTATIVE | G |
| COMPANY A | REPRESENTATIVE | B |
| COMPANY A | REPRESENTATIVE | D |
| COMPANY H | LOCATION | COUNTRY C |

FIG. 5B

OUTPUT EXAMPLE OF DATA AGGREGATING

| TARGET OBJECT | ATTRIBUTE NAME | ATTRIBUTE VALUE | THE NUMBER OF OCCURRENCES |
|---|---|---|---|
| COMPANY A | REPRESENTATIVE | B | 2 |
| COMPANY F | REPRESENTATIVE | G | 1 |
| COMPANY A | REPRESENTATIVE | D | 1 |
| COMPANY H | LOCATION | COUNTRY C | 1 |

FIG. 5C

OUTPUT EXAMPLE OF INCONSISSTENCY DETECTING UNIT

| TARGET OBJECT | ATTRIBUTE NAME | ATTRIBUTE VALUE | THE NUMBER OF OCCURRENCES |
|---|---|---|---|
| COMPANY A | REPRESENTATIVE | B | 2 |
| COMPANY A | REPRESENTATIVE | D | 1 |

FIG. 5D

OUTPUT EXAMPLE OF CORRECTNESS/INCORRECTNESS DETERMINING UNIT

| DATA | CORRECTNESS/INCORRECTNESS DETERMINATION |
|---|---|
| COMPANY A   REPRESENTATIVE   B | CORRECT |
| COMPANY A   REPRESENTATIVE   D | INCORRECT →DISCARDING |

FIG. 5E

OUTPUT EXAMPLE OF FINAL DATA INTEGRATING UNIT

| TARGET OBJECT | ATTRIBUTE NAME | ATTRIBUTE VALUE |
|---|---|---|
| COMPANY A | REPRESENTATIVE | B |
| COMPANY F | REPRESENTATIVE | G |
| COMPANY H | LOCATION | COUNTRY C |

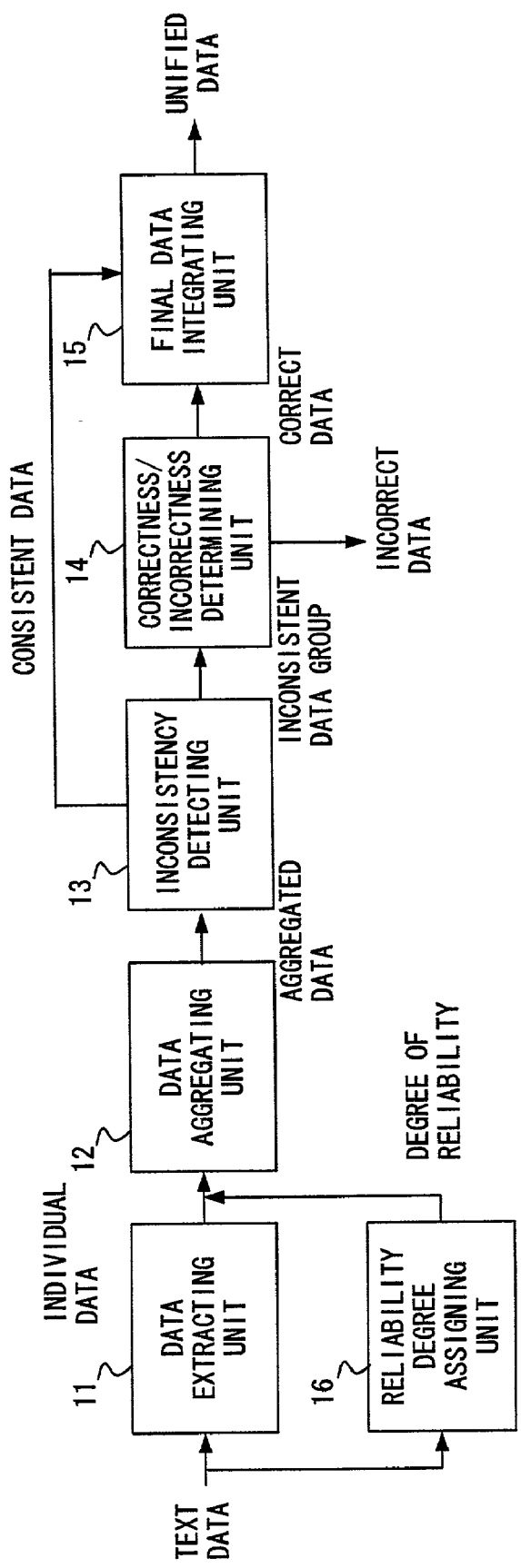
F I G. 7

EXAMPLE OF ORIGINAL TEXT AND EXTRACTED DATA

| ORIGINAL TEXT | TARGET OBJECT | ATTRIBUTE NAME | ATTRIBUTE VALUE |
|---|---|---|---|
| PERSON B IS INAUGURATED AS REPRESENTATIVE OF COMPANY A | COMPANY A | REPRESENTATIVE | B |
| PRESIDENT D OF COMPANY A PASSED AWAY | COMPANY F | REPRESENTATIVE | PRESIDENT D |
| COMPANY A PUTS B ON THE MARKET | COMPANY A | PRODUCT | B |

FIG. 9A

EXAMPLE OF CORRESPONDENCE TABLE BETWEEN ORIGINAL TEXT AND KEY WORD

| ORIGINAL TEXT | EXTRACTED KEYWORDS |
|---|---|
| PERSON B IS INAUGURATED AS REPRESENTATIVE OF COMPANY A | COMPANY A, COMPANY A, PERSON B, INAUGURATED |
| PRESIDENT D OF COMPANY A PASSED AWAY | COMPANY A, PRESIDENT D, PASS AWAY |
| COMPANY A PUTS B ON THE MARKET | COMPANY A, B, PUT ON THE MARKET |

FIG. 9B

EXAMPLE OF KEYWORD/EVENT TYPE CORRESPONDENCE TABLE

| KEYWORD | EVENT TYPE | DEGREE OF RELIABILITY |
|---|---|---|
| INAUGURATED, DISMISS | PERSONNEL RESHUFFLE | 0.8 |
| PASS AWAY | OBITUARY NOTICE | 0.9 |

FIG. 9C

EXAMPLE OF EVENT TYPE/DEGREE OF RELIABILITY CORRESPONDENCE TABLE

| EVENT TYPE | DEGREE OF RELIABILITY |
|---|---|
| PERSONNEL RESHUFFLE | 0.8 |
| OBITUARY NOTICE | 0.9 |
| DEFAULT | 0.5 |

FIG. 9D

DETERMINATION EXAMPLE OF EVENT TYPE OF TEXT

| ORIGINAL TEXT | EXTRACTED KEYWORDS | EVENT TYPE |
|---|---|---|
| PERSON B IS INAUGURATED AS REPRESENTATIVE OF COMPANY A | COMPANY A, REPRESENTATIVE, PERSON B, INAUGURATED | PERSONNEL RESHUFFLE |
| PRESIDENT D OF COMPANY A PASSED AWAY | COMPANY A, PRESIDENT B, PASS AWAY | OBITUARY |
| COMPANY A PUTS B ON THE MARKET | COMPANY A, B, PUT ON THE MARKET | DEFAULT |

F I G. 1 0 A

EXAMPLE OF DEGREE OF RELIABILITY ASSIGNED TO EACH DATA

| ORIGINAL TEXT | EVENT TYPE | DEGREE OF RELIABILITY |
|---|---|---|
| PERSON B IS INAUGURATED AS REPRESENTATIVE OF COMPANY A | PERSONNEL RESHUFFLE | 0.8 |
| PRESIDENT D OF COMPANY A PASSED AWAY | OBITUARY NOTICE | 0.9 |
| COMPANY A PUTS B ON THE MARKET | DEFAULT | 0.5 |

F I G. 1 0 B

EXAMPLE OF METHOD EVALUATING DEGREE OF ATTENTION

FIG. 12A

| | |
|---|---|
| SUBJECT WORD | 0.8 |
| OBJECT WORD | 0.5 |
| OTHER ELEMENTS | 0.4 |

EXAMPLE OF DEGREE OF ATTENTION ASSIGNED TO OBJECT WITHIN ORIGINAL TEXT (THE DEGREE OF ATTENTION IS SET BY RECOGNIZING THE DEGREES OF ATTENTION OF SUBJECT AND OBJECT WORDS TO BE HIGHER IN THIS ORDER)

FIG. 12B

| ORIGINAL TEXT | A社の | B社長は | 新製品群を発表 |
|---|---|---|---|
| | ⇩ | ⇩ | ⇩ |
| DEGREE OF ATTENTION | 0.4 | 0.8 | 0.5 |

| ORIGINAL TEXT | A大臣は | B社長と | 懇談 |
|---|---|---|---|
| | ⇩ | ⇩ | |
| DEGREE OF ATTENTION | 0.8 | 0.4 | |

FIG. 12C  EXAMPLE OF CORRESPONDENCE TABLE BETWEEN WORD POSITION AND DEGREE OF ATTENTION

POSITION < 5    DEGREE OF ATTENTION = 5 - POSITION
POSITION => 5   DEGREE OF ATTENTION = 0

FIG. 12D  EXAMPLE OF ALGORITHM EVALUATING DEGREE OF RELIABILITY

DEGREE OF ATTENTION > $\alpha$    DEGREE OF RELIABILITY = 0.9
DEGREE OF ATTENTION $\leq$ $\alpha$    DEGREE OF RELIABILITY = 0.7

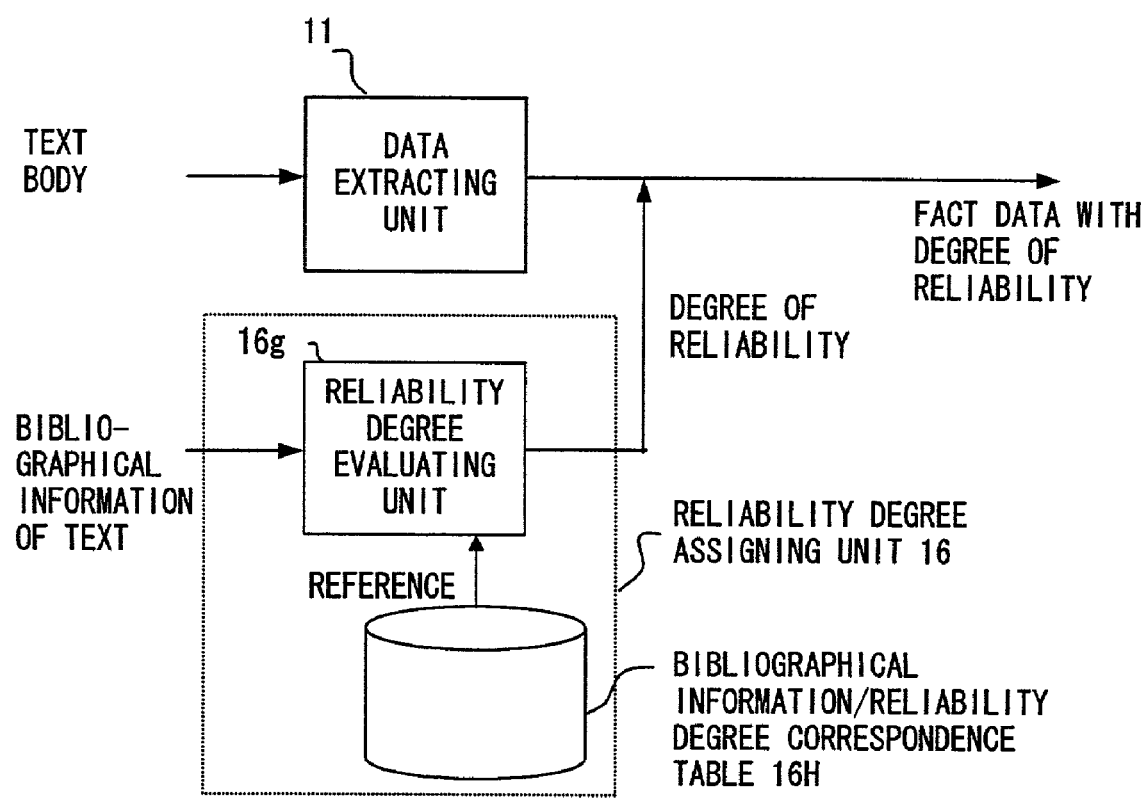
F I G. 1 3

FIG. 14A  EXAMPLE OF DESCRIPTION WITHIN ORIGINAL TEXT AND BIBLIOGRAPHICAL INFORMATION

| TEXT | MEDIA |
|---|---|
| PRESIDENT B OF COMPANY A | A NEWS OFFICE |
| COMPANY A (REPRESENTATIVE D) | B NEWS OFFICE |
| COMPANY A (HEADQUARTERS: E-SHI, C PREFECTURE) | C NEWS AGENCY |

FIG. 14B  EXAMPLE OF BIBLIOGRAPHICAL INFORMATION/RELIABILITY DEGREE CORRESPONDENCE TABLE

| MEDIA | DEGREE OF RELIABILITY |
|---|---|
| A NEWS OFFICE | 0.6 |
| B NEWS OFFICE | 0.8 |
| C NEWS AGENCY | 0.9 |

FIG. 14C  EXAMPLE OF OUTPUT OF DATA INTEGRATING UNIT

| TARGET OBJECT | ATTRIBUTE NAME | ATTRIBUTE VALUE | DEGREE OF RELIABILITY |
|---|---|---|---|
| COMPANY A | REPRESENTATIVE | B | 0.6 |
| COMPANY A | REPRESENTATIVE | D | 0.8 |
| COMPANY H | LOCATION | COUNTRY C | 0.9 |

FIG. 14D  EXAMPLE OF OUTPUT OF INCONSISTENCY DETECTING UNIT

| TARGET OBJECT | ATTRIBUTE NAME | ATTRIBUTE VALUE | DEGREE OF RELIABILITY |
|---|---|---|---|
| COMPANY A | REPRESENTATIVE | B | 0.6 |
| COMPANY A | REPRESENTATIVE | D | 0.8 |

FIG. 14E  EXAMPLE OF DETERMINATION MADE BY CORRECTNESS/INCORRECTNESS DETERMINING UNIT

| TARGET OBJECT | ATTRIBUTE NAME | ATTRIBUTE VALUE | DEGREE OF RELIABILITY | CORRECT/INCORRECT |
|---|---|---|---|---|
| COMPANY A | REPRESENTATIVE | B | 0.6 | INCORRECT |
| COMPANY A | REPRESENTATIVE | D | 0.8 | CORRECT |

FIG. 14F  EXAMPLE OF OUTPUT OF INCONSISTENCY DETECTING UNIT

| TARGET OBJECT | ATTRIBUTE NAME | ATTRIBUTE VALUE |
|---|---|---|
| COMPANY A | REPRESENTATIVE | B |

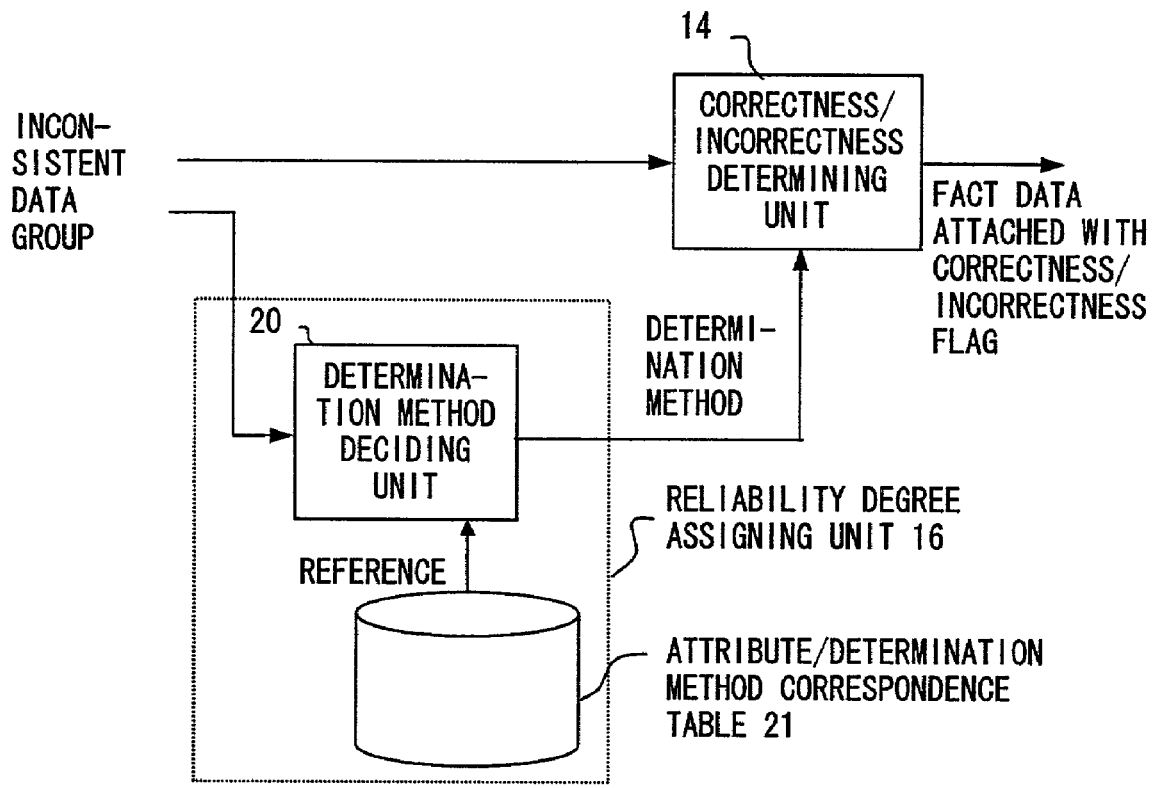
F I G. 16

EXAMPLE OF EXTRACTED DATA

| | | |
|---|---|---|
| COMPANY A | TELEPHONE NUMBER | 03-356-7098 |
| COMPANY B | TELEPHONE NUMBER | 119-0003 |

FIG. 18A

EXAMPLE OF ERROR PATTERN

| ATTRIBUTE NAME | NORMAL EXPRESSION | MEANING |
|---|---|---|
| TELEPHONE NUMBER | ^ [ ^ 0] [0 - 9] + | NUMBER THAT DOES NOT BEGIN WITH "0" |

FIG 18B

EXAMPLE OF CORRECTNESS/INCORRECTNESS DETERMINATION

| DATA | CORRECTNESS/INCORRECTNESS |
|---|---|
| COMPANY A   TELEPHONE NUMBER   03-356-7098 | CORRECTNESS |
| COMPANY B   TELEPHONE NUMBER   119-0003 | INCORRECTNESS |

FIG. 18C

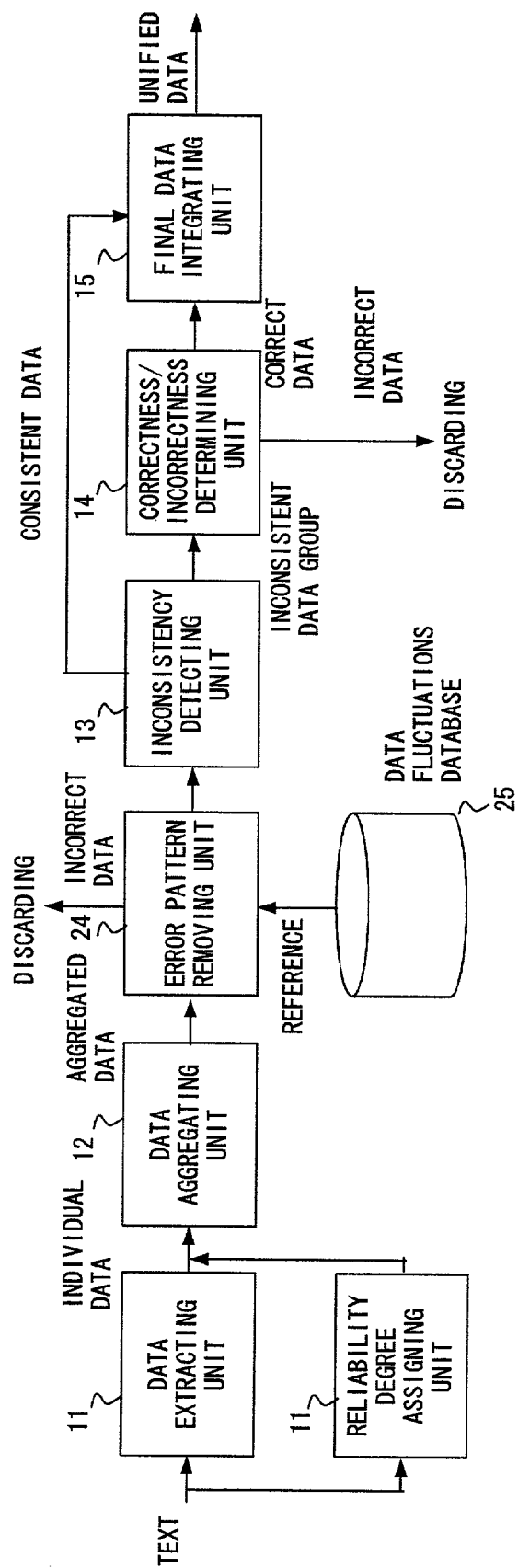
F I G. 1 9

EXAMPLE OF EXTRACTED DATA

| TARGET OBJECT | ATTRIBUTE NAME | ATTRIBUTE VALUE | FREQUENCY |
|---|---|---|---|
| COMPANY A | REPRESENTATIVE | ICHIRO YAMADA | 20 |
| COMPANY A | REPRESENTATIVE | YAMADA | 30 |
| COMPANY A | REPRESENTATIVE | TARO SUZUKI | 30 |

FIG. 20A

EXAMPLE OF DATA UNIFYING PROCESS

| TARGET OBJECT | ATTRIBUTE NAME | ATTRIBUTE VALUE | FREQUENCY |
|---|---|---|---|
| COMPANY A | REPRESENTATIVE | ICHIRO YAMADA (20 OCCURRENCES OF YAMADA ARE ADDED) | 40 |
| COMPANY A | REPRESENTATIVE | TARO SUZUKI | 30 |

FIG. 20B

EXAMPLE OF CORRECTNESS/INCORRECTNESS DETERMINATION

| TARGET OBJECT | ATTRIBUTE NAME | ATTRIBUTE VALUE | FREQUENCY | CORRECTNESS/ INCORRECTNESS |
|---|---|---|---|---|
| COMPANY A | REPRESENTATIVE | ICHIRO YAMADA | 40 | CORRECT |
| COMPANY A | REPRESENTATIVE | TARO SUZUKI | 30 | INCORRECT |

FIG. 20C

FACT DATA UNIFYING METHOD AND APPARATUS

BACKGROUND OF THE INVENTION

1. Field of the Invention

The present invention relates to a fact data unifying method and apparatus which extracts a description of a fact within a document, puts the extracted description into a database as a set of data having consistency, and detects or corrects a corresponding error included in an original text based on an inconsistent point of fact data.

2. Description of the Related Art

A variety of methods were conventionally proposed as a technique extracting information within a text. By way of example, for data in compliance with a predetermined framework such as new product information, organism information, etc., a correspondence table between an expression format and data to be extracted within a text is stored, and corresponding data is extracted when a match is found for the expression format stipulated by scanning a text.

Assume that a correspondence table shown in FIG. 1A is stored, and fact data which is composed of a target object, an attribute name, and an attribute value, and is shown in FIGS. 1B and 1C, is extracted. In this example, "a new president of a company C" and "a person D is assigned" respectively match *1 and *2 in the correspondence table. Therefore, "company C" is extracted as a target object, "representative" is extracted as an attribute name, and "person D" is extracted as an attribute value.

If a target is limited to an error on a representation level included in a text, various error correction techniques already exist. By way of example, a method registering an expression included in a text, and pointing to an unregistered word, a method pointing to representation fluctuations, etc. are known.

As described above, fact data extraction from a text is widely used. However, it is not always possible to obtain information desired to view only from the information from one point within a text. Therefore, data from the whole of a text must normally be unified.

Generally, however, data to be extracted includes a considerable number of errors (or data inconsistencies) such as an error included in a text itself, an error in an extraction process, etc., (or data inconsistency). Since errors must manually be checked and removed, or rewritten, data cannot simply be aggregated.

SUMMARY OF THE INVENTION

The present invention was developed in consideration of the above described background, and aims at enabling suitable data to be aggregated by correcting or standardizing an error or representation fluctuations within extracted data due to an incorrect description within a text or an error in an extraction process.

FIG. 2 is a block diagram showing the fundamental configuration of the present invention. In this figure, 1 is a data extracting unit extracting from a text fact data stipulated by a combination of three such as a target object, an attribute name, and an attribute value; 2 is a data aggregating unit grouping the same data, and aggregating the number of occurrences; 3 is an inconsistency detecting unit detecting a group of inconsistent data that is inconsistent as a result of scanning the data set concerning the same object within the output of the data aggregating unit; 4 is a correctness/incorrectness determining unit determining which data is correct within an inconsistent data group; 5 is an integrating unit integrating data aggregated by the data aggregating unit, and data determined to be correct by the correctness/incorrectness determining unit.

Furthermore, 6 is a reliability degree assigning unit assigning the degree of reliability to fact data when the fact data is extracted from a text; 7 is a data unifying unit unifying similar data into one data; 8 is an error pattern removing unit discarding as an error fact data which matches a pre-registered error pattern; and 9 is a determination method deciding unit deciding a correctness/incorrectness determination method executed by the correctness/incorrectness determining unit.

As shown in FIG. 2, according to the present invention, the above described problems are solved as follows.

(1) The data extracting unit 1 extracting from a text fact data stipulated by a combination of three such as a target object, an attribute name, and an attribute value; the data aggregating unit 2 grouping the same data throughout a text, and aggregating the number of occurrences; the inconsistency detecting unit 3 detecting an inconsistent data group by scanning a data set concerning the same object within the output of the data aggregating unit 2, and; the correctness/incorrectness determining unit 4 determining which data is correct within the inconsistent data group detected by the inconsistency detecting unit 3; and the final data integrating unit 5 integrating the correct data aggregated by the data aggregating unit 2, and the data determined to be correct by the correctness/incorrectness determining unit 4 are comprised, so that suitable data can be unified by removing error data from extracted fact data.

(2) In the above provided (1), the reliability degree assigning unit 6 assigning the degree of reliability to fact data when the fact data is extracted from a text is further comprised. When the number of occurrences is aggregated by the data aggregating unit 2, the degree of reliability of aggregated data is calculated from the degrees of reliability of individual data, and the calculated degree of reliability is assigned to an aggregation result. The correctness/incorrectness determining unit 4 determines whether each data within a data group is either correct or incorrect by using the degree of reliability assigned to the aggregated data, leading to an improvement in the correctness/incorrectness determination.

(3) In the above provided (2), the reliability degree assigning unit 6 is configured by an event type extracting unit determining the type of event information possessed by a text, which is determined to be an extraction target when fact data is extracted from the text, and a reliability degree evaluating unit evaluating the degree of reliability from an event type based on a correspondence table between an event type and the degree of reliability, so that an accurate degree of reliability is assigned.

(4) In the above provided (2), the reliability degree assigning unit 6 is configured by an attention degree evaluating unit calculating the degree of attention to a target object being an extraction target within a text, and a reliability degree evaluating unit evaluating the degree of reliability of data based on the degree of attention, so that an accurate degree of reliability is assigned.

(5) In the above provided (2), the reliability degree assigning unit 6 is configured by a correspondence table between the bibliographical information such as an issuance source, an author, etc. of a text, and the degree of reliability of each data described in the text, and a reliability degree evaluating unit evaluating the degree of reliability of a text based on the bibliographical information of the text by referencing the correspondence table between the bibliographical information and the degree of reliability, so that the degree of reliability for which a general tendency is considered based on an author, an issuance source, etc. is assigned.

(6) In the above provided (5), a correctness/incorrectness flag is attached to the fact data extracted by the data extracting unit 1, the fact data attached with the correctness/incorrectness flag is input, and an expectation value of correctness/incorrectness of data having a particular attribute value is calculated for each attribute name of fact data, and a correspondence table between bibliographical information and the degree of reliability is generated, so that a correspondence table between an attribute value and the degree of reliability is semi-automatically generated from a text.

(7) In the above provided (1) through (6), an attribute/determination method correspondence table making a correspondence between a target object, an attribute name, and a determination method used when a correctness/incorrectness determination is made; and a determination method deciding unit deciding a correctness/incorrectness determination method according to an attribute name based on the attribute/determination method correspondence table are arranged. The correctness/incorrectness determining unit makes a correctness/incorrectness determination with the determination method specified by the determination method deciding unit when an inconsistent data group is input, so that a flexible correctness/incorrectness determination according to an attribute is made.

(8) In the above provided (1) through (7), an error pattern removing unit is arranged between the data extracting unit 1 and the inconsistency detecting unit 3. The error pattern removing unit 8 determines whether each data is either correct or incorrect by making a matching between the fact data extracted by the data extracting unit 1 and a pre-registered error pattern. If the extracted fact data matches a pre-registered error pattern, the data is determined to be incorrect and is discarded, and only the data determined to be correct is transmitted to the inconsistency detecting unit 3, whereby an error that the error removing unit can determine alone is removed.

(9) In the above provided (1) through (6), the data unifying unit 7 is arranged after the data aggregating unit 2. The data unifying unit 7 unifies similar data into one data, and passes the unified data to the inconsistency detecting unit 3, so that fluctuations caused by different expressions of the same object are absorbed.

BRIEF DESCRIPTION OF THE DRAWINGS

FIGS. 1A through 1D explain the method extracting information within text;

FIGS. 5A through 5E exemplify the process performed in the first preferred embodiment;

FIG. 7 is a block diagram showing the functions of a second preferred embodiment according to the present invention;

FIGS. 9A through 9D exemplify a process performed by the reliability degree assigning unit shown in FIG. 8 (No. 1);

FIGS. 10A and 10B exemplify a process performed by the reliability degree assigning unit shown in FIG. 8 (No. 2);

FIGS. 12A through 12D exemplify a process performed by the reliability degree assigning unit shown in FIG. 11;

FIG. 13 exemplifies a third internal configuration of the reliability degree assigning unit;

FIGS. 14A through 14F exemplify a process performed by the reliability degree assigning unit shown in FIG. 13;

FIG. 16 exemplifies a third preferred embodiment according to the present invention;

FIGS. 18A through 18C exemplify an error pattern determination in the fourth preferred embodiment;

FIG. 19 shows a fifth preferred embodiment according to the present invention; and FIGS. 20A through 20C exemplify a process performed in the fifth preferred embodiment.

DESCRIPTION OF THE PREFERRED EMBODIMENTS

Hereinafter, preferred embodiments according to the present invention will be explained.

Figure 2:
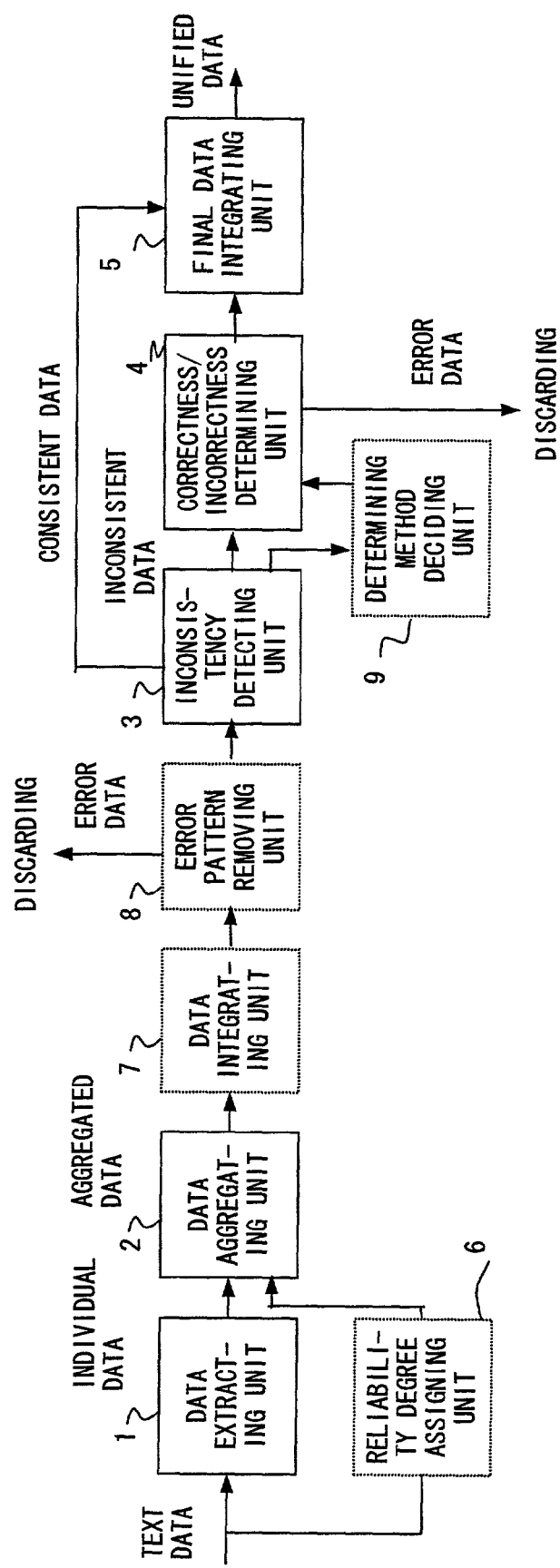
FIG. 2 is a block diagram showing the fundamental configuration of the present invention.
Figure 3:
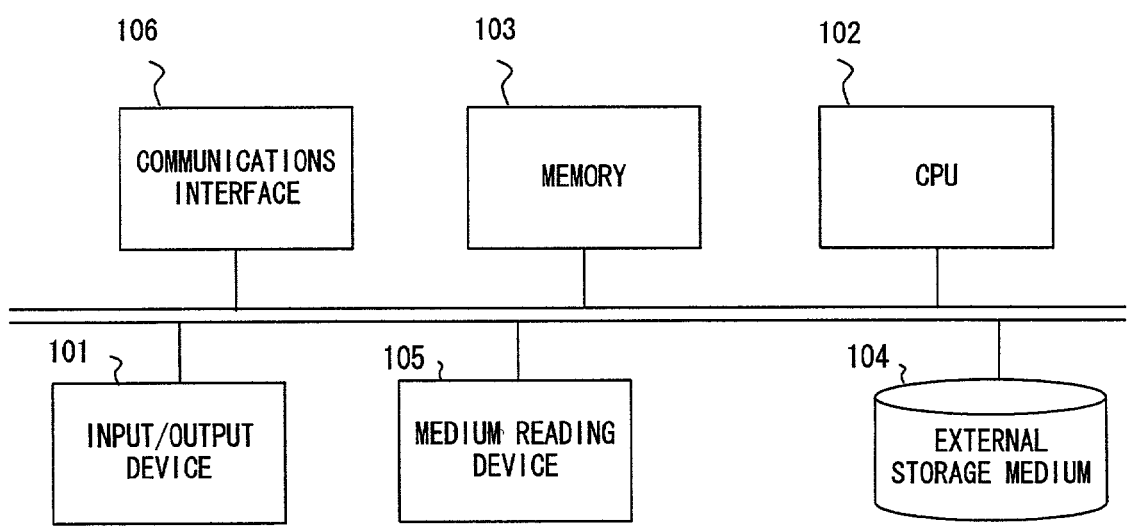
FIG. 3 exemplifies the configuration of a system performing a fact data unifying process.

FIG. 3 exemplifies the configuration of a system performing a fact data unifying process, according to the present invention. In this figure, 101 is an input/output device composed of a display device such as a CRT, a liquid crystal display, etc., and an input device for inputting characters, symbols, commands, etc., such as a keyboard, a mouse, etc.; 102 is a CPU; 103 is a memory composed of a ROM, a RAM, etc.; 104 is an external storage device storing programs, data, etc.; 105 is a medium reading device reading/writing data by accessing a portable storage medium such as a floppy disk, an MO, a CD-ROM, etc.; and 106 is a communications interface including a modem making a data communication by using a telephone line, a network card for making a data communication by using a network such as a LAN, etc.

The external storage device 104 stores the programs performing a fact data unifying process according to the present invention, text data from which fact data is extracted, unified data obtained as a result of performing the fact data unifying process, and the like.

Figure 4:
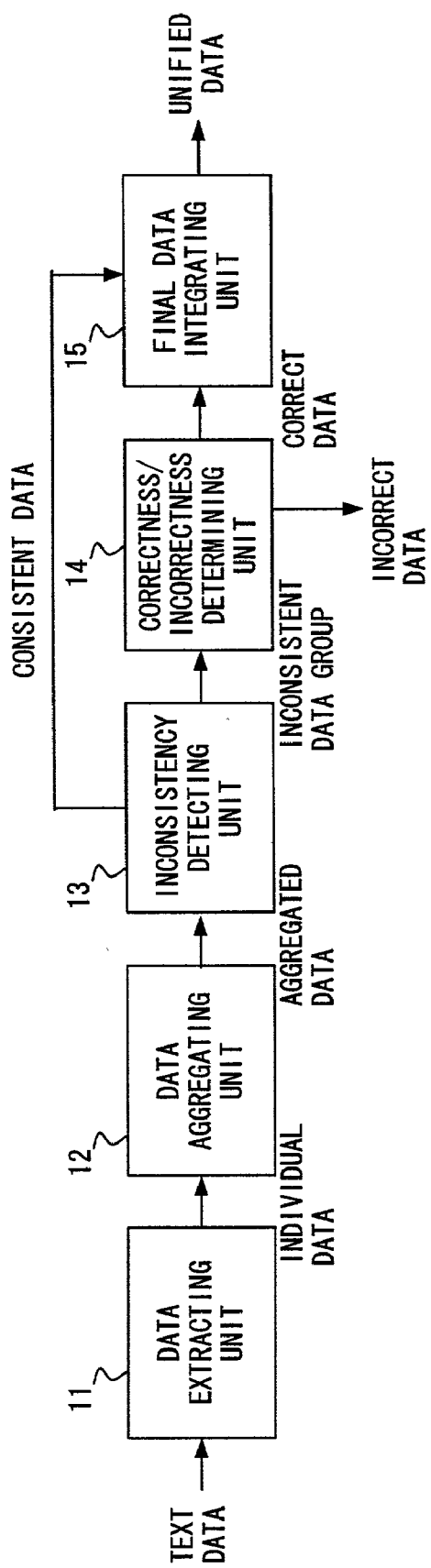
FIG. 4 shows a first preferred embodiment according to the present invention.

FIG. 4 is a block diagram showing the functions of a first preferred embodiment according to the present invention. The first preferred embodiment is explained with reference to this figure.

In FIG. 4, 11 is a data extracting unit analyzing a description of fact data within a text, and extracting the description as fact data; 12 is a data aggregating unit grouping data of the same type among the fact data extracted by the data extracting unit 11 into one data, and counting the number of occurrences of each fact data; 13 is an inconsistency detecting unit searching for an inconsistency (such as a combination of inconsistent fact data which cannot be consistent) within a set of fact data extracted from a text; 14 is a correctness/incorrectness determining unit determining which inconsistent data detected by the inconsistency detecting unit 13 is correct/incorrect; and 15 is a final data integrating unit integrating and presenting data determined to be correct.

In FIG. 4, when text data is input, the data extracting unit 12 analyzes a description within the text, and extracts the description as fact data, similar to the method explained in the above described conventional example.

FIG. 5A is an output of the data extracting unit 12 in the case where the correspondence table shown in FIG. 1A is used, and fact data in an expression format stipulated in the correspondence table is extracted from a text. According to this correspondence table, fact data composed of target objects (company A, company F, . . . , company H), attributes names (representative, . . . , location), and attribute values (country B, country G, . . . country C) is extracted as shown in FIG. 5A.

The data aggregating unit 12 sorts the fact data, groups the same data, and counts the occurrences of each fact data. FIG. 5B exemplifies an output of the data aggregating unit 12 with regard to the fact data shown in FIG. 5A. As shown in this figure, target objects, attribute names, attribute values, and the numbers of occurrences of the fact data matching the target object, attribute names, and the attribute values are output.

The inconsistency detecting unit 13 detects inconsistent data within a fact data set. For this detection, by way of example, the following process is performed.

i) The following operations are repeated for all of target objects within a data set.

ii) The following operations are repeated for all of attribute names possessed by selected target objects.

iii) If there are a plurality of attribute values corresponding to the same attribute name, the corresponding data group is output as an inconsistent data group, and others are output as consistent data.

FIG. 5C exemplifies inconsistent data detected by the inconsistency detecting unit 13. As shown in this figure, there are two attribute value types "B" and "D" for the target object "company A" and an attribute name "representative" among the fact data aggregated by the data aggregating unit 12 as shown in FIG. 5C. Therefore, the attribute values "B" and "D" are detected as inconsistent data, and transmitted to the correctness/incorrectness determining unit 14. The rest of the data aggregated by the data aggregating unit 12 is transmitted to the final data integrating unit as consistent data.

The correctness/incorrectness determining unit 14 determines which inconsistent data is correct/incorrect.

For this process, the following diversified algorithms are considered.

i) Data having the maximum number of occurrences within a group is determined to be correct, and the others are determined to be incorrect.

ii) Data having the number of occurrences, which is equal to or larger than a particular threshold value, is determined to be correct, and the others are determined to be incorrect.

FIG. 5D exemplifies an output of the correctness/incorrectness determining unit 14. This is an example of an output in the case where a correctness/incorrectness determination is made with the algorithm provided in the above described i).

The number of occurrences of the attribute value "B" is 2, and that of "D" is 1 among the attribute values "B" and "D" of the target object "company A" and the attribute name "representative", which are detected as inconsistent data. Therefore, in this example, the attribute value "B" is adopted as "correctness", whereas the attribute value "D" is discarded as "incorrectness" as shown in FIG. 5D.

The final data integrating unit 15 integrates and presents the data transmitted from the inconsistency detecting unit 13 as consistent data, and the data determined to be correct by the correctness/incorrectness determining unit 14. FIG. 5E exemplifies an output of the final data unifying unit 15. As shown in this figure, data which is transmitted from the inconsistency detecting unit 13 as consistent data, and data which is determined to be correct by the correctness/incorrectness determining unit 14 among the data aggregated by the data aggregating unit 12 are output as correct data.

Figure 6:
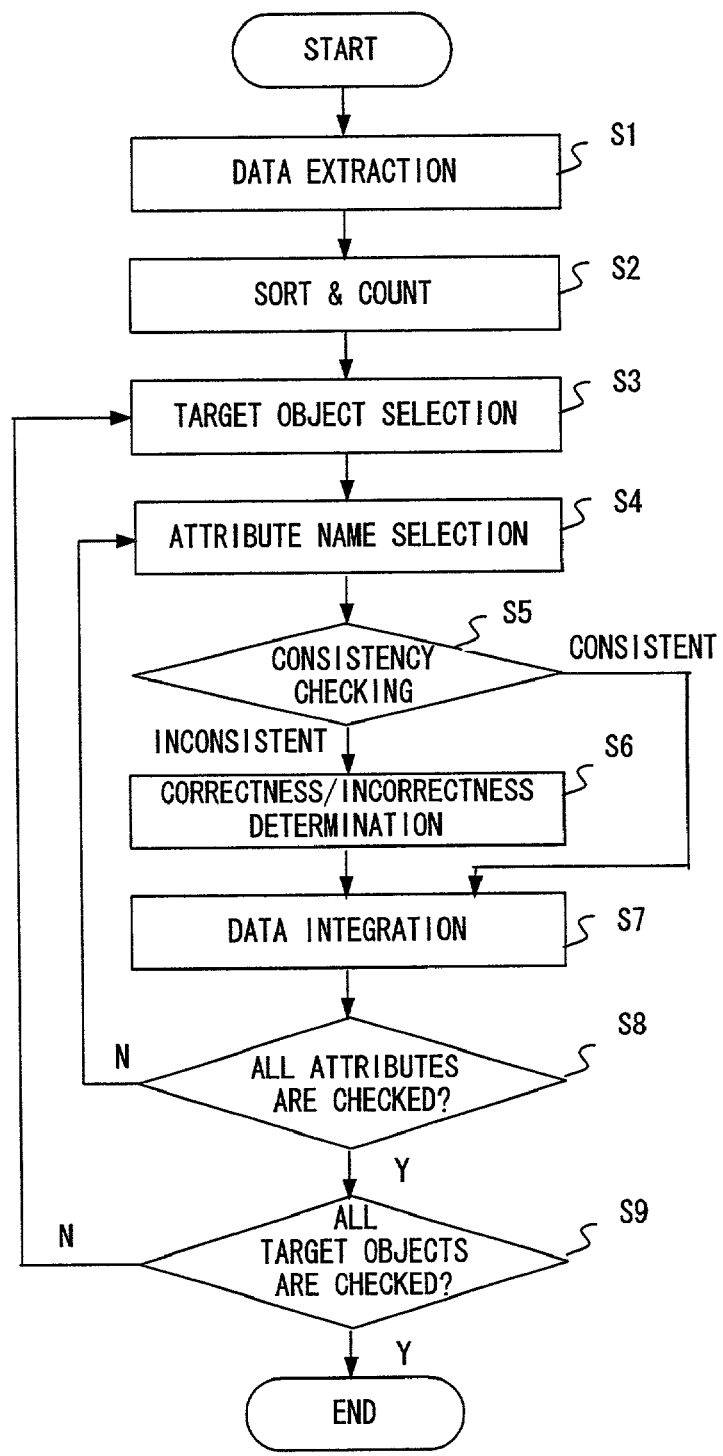
FIG. 6 is a flowchart showing the process performed in the first preferred embodiment.

FIG. 6 is a flowchart showing the process performed in this preferred embodiment. This process is explained with reference to this figure.

In FIG. 6, a description of fact data within input text data is analyzed and extracted as fact data in step S1, so that, for example, the fact data shown in FIG. 5A are obtained.

In step S2, extracted fact data are sorted according to target objects, attribute names, and attribute values, and the numbers of occurrences of the sorted data are counted. As a result, the data shown in FIG. 5B is obtained.

In step S3, one of the sorted target objects is extracted. In step S4, one of attribute names for the extracted target object is selected. In step S5, its consistency is checked. For example, if the inconsistent data shown in FIG. 5C is detected, the process goes to step S6 where it is determined whether the inconsistent data is either correct or incorrect with the algorithm provided in the above described i) or ii), and incorrect data is discarded. If the data is determined to be consistent, this data is integrated in step S7.

In step S8, it is determined whether or not the consistency checking is completed for the attribute names. If the consistency checking is not completed, the process goes back to step S4, and the above described operations are repeated. If the consistency checking for the attribute names is determined to be completed, it is determined whether or not the consistency checking for the target objects is completed in step S9. If the consistency checking is not completed, the process goes back to step S3 and the above described operations are repeated. If the consistency checking is determined to be completed for the target objects, the process is terminated.

FIG. 7 is a block diagram showing the functions of a second preferred embodiment according to the present invention. This preferred embodiment is implemented by adding a reliability degree assigning unit to the first preferred embodiment so as to assign the degree of reliability of text data, and is intended to make a correctness/incorrectness determination based on the degree of reliability.

In this figure, the data extracting unit 11 analyzes a description of fact data within a text, and extracts the description as fact data as described above. Additionally, a reliability degree assigning unit 16 evaluates the degree of reliability of extracted data by using the information possessed by a text from which data is to be extracted.

As a specific evaluation method, for example, the following methods are available.

(1) Evaluation of the degree of reliability according to an event type

An event type is extracted from a partial text, and the degree of reliability of the partial text is evaluated (Note that an event type is extracted from a partial text by using a database in which a target event, an attribute, and a partial text are corresponded).

(2) Evaluation of the degree of reliability according to the degree of attention The degree of reliability is evaluated by noting the degree of attention of a target object within the text.

(3) Evaluation of the degree of reliability according to bibliographic information The degree of reliability is evaluated according to bibliographic information (an author, publication media, etc.) possessed by a text. For example, if a text is a newspaper article, its degree of reliability is evaluated depending on whether the newspaper is either a popular paper or a quality paper as a news source.

Here, an event type is attached in correspondence with a word included in an article. To be more specific, a database in which a correspondence between a particular word and an event type is made is generated. For example, an event type "personnel reshuffle" is attached to words such as "new president", "inauguration", etc., an event type "obituary notice" is attached to words such as "death", and the like.

Next, the data aggregating unit 12 calculates the degree of reliability as a data aggregation from individual degrees of reliability in order to aggregate data having the degree of reliability.

The following examples are considered as this algorithm.

i) The highest degree of reliability among the degrees of reliability of individual data is defined to be the degree of reliability of a data aggregation.

ii) An average of the degrees of reliability of individual data is defined to be the degree of reliability of a data aggregation.

The correctness/incorrectness determining unit 15 determines which data is correct based on the degree of reliability of a data aggregation and the numbers of occurrences. The following examples are considered as this algorithm.

i) The highest degree of reliability among the degrees of reliability of individual data is defined to be correct, and the remaining data are defined to be incorrect.

ii) A threshold value of the degree of reliability is set, and data having a particular or higher degree of reliability is defined to be correct.

Figure 8:
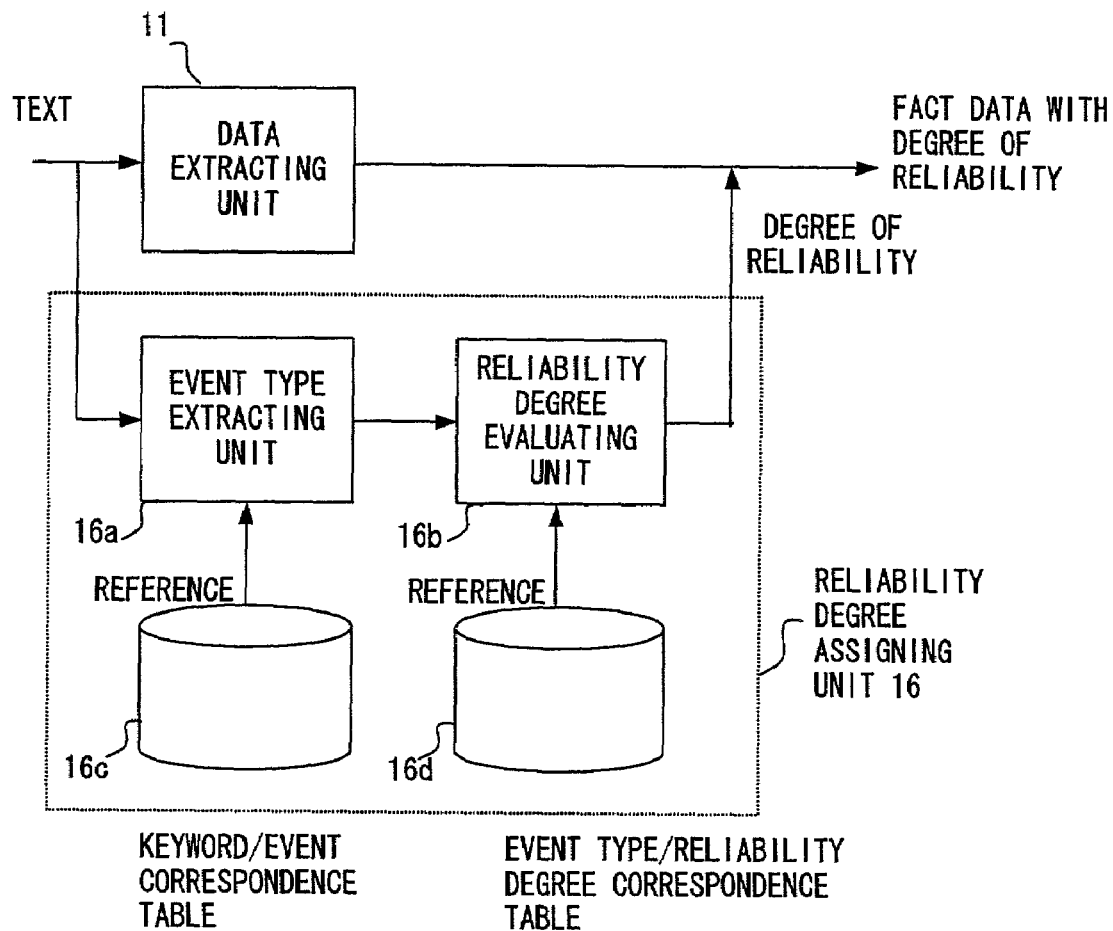
FIG. 8 exemplifies a first internal configuration of a reliability degree assigning unit.

FIG. 8 exemplifies a first internal configuration of the reliability assigning unit 16 shown in FIG. 7. This example shows the configuration in the case where the degree of reliability is evaluated according to an event type defined in the above described (1).

In FIG. 8, 11 is the above described data extracting unit extracting object data from a text. The data extracting unit 11 analyzes a description of fact data within a text, and extracts the description as data as stated earlier. Assume that original texts are "a person B is inaugurated as a representative of a company A", "President D of a company A passed away", and "a company A puts B on the market" as shown in FIG. 9A. In this case, the "company A" is extracted as a target object, the "representative" and "product" are extracted as attribute names, and the "person B", "President D", and "B" are extracted as attribute values.

16 is the reliability degree assigning unit. An event type extracting unit 16a within the reliability degree assigning unit 16 extracts the keyword group such as the one shown in FIG. 9B from the original texts, and determines that a corresponding event type is possessed if a keyword included in the text matches any of the values within the table. As a result, event types are extracted from the partial texts being extraction targets shown in FIG. 10A.

The reliability evaluating unit 16b evaluates the degrees of reliability of fact data according to the event types by referencing an event type/reliability degree correspondence table 16d shown in FIG. 9D, as illustrated by FIG. 10B. If the degree of reliability of fact data which does not correspond to an event type defaults to, for example, 0.5.

By assigning the degree of reliability as described above, the degree of reliability can accurately be evaluated with the use of the knowledge such that, for example, the degree of reliability of an obituary notice is higher than that of an article regarding personnel reshuffle because especially careful checking is made to the personal data in an obituary notice.

Figure 11:
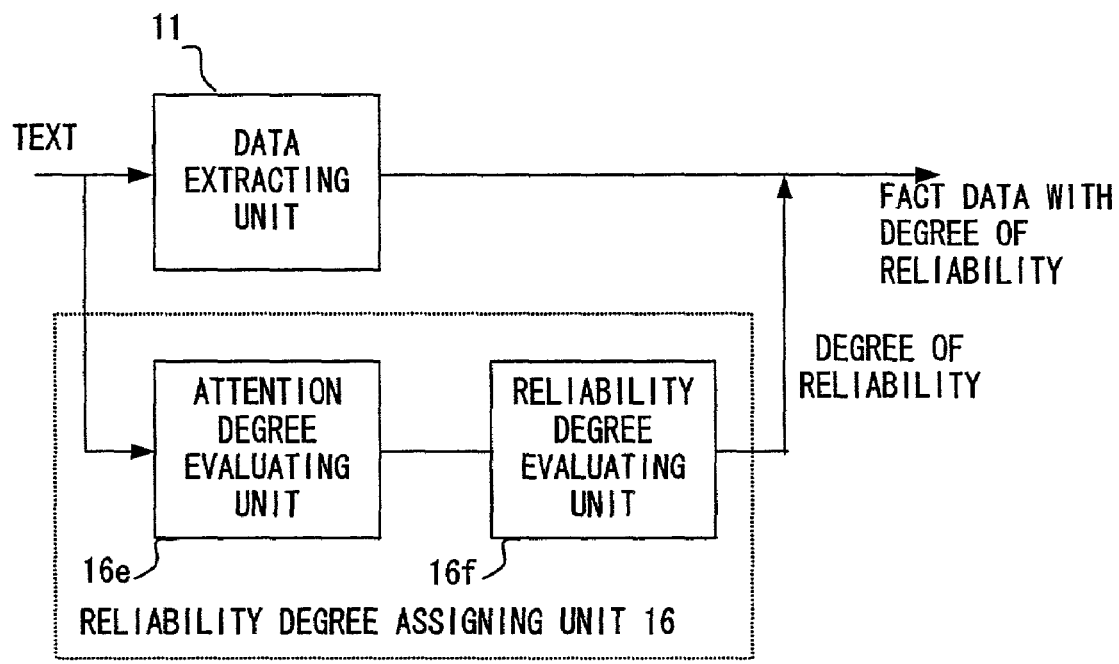
FIG. 11 exemplifies a second internal configuration of the reliability degree assigning unit.

FIG. 11 exemplifies a second internal configuration of the reliability degree assigning unit. This example shows the configuration in the case where the degree of reliability is evaluated according to the degree of attention in the above described (2).

In FIG. 11, 11 is an object data extracting unit extracting object data itself, 16 is a reliability degree assigning unit, 16e is an attention degree evaluating unit evaluating the degree of attention of an object to be extracted within a text, and 16f is a reliability degree evaluating unit evaluating the degree of reliability according to the degree of attention.

As the method evaluating the degree of attention, which is executed by the attention degree evaluating unit 16e, the following algorithms can be considered.

Note that the explanation given below mainly refers to Japanese-language text, but it is easily recognized that similar algorithms could be applied to text in another language by one skilled in the art.

i) Examining a postpositional particle which immediately succeeds a target object, and the degree of attention of an object followed by a modifying postpositional particle such as "は", "も", etc. is defined to be the highest. The degree of attention is defined to be low in other cases. (Examining whether or not a target object is a subject word. If the target object is a subject word, the degree of attention is defined to be the highest. If not, and the degree of attention is defined to be low in other cases. For example, as shown in FIG. 12A, the degrees of attention of the subject word attached with the modifying postpositional particle, an object word, and the other element are respectively set to be 0.8, 0.5, and 0.4. It is determined whether or not the object data within an original text is either the subject or the object word, or the other element is determined as shown in FIG. 12B. Then, the degree of attention is set according to the determination result.

ii) The position of a target object within a text (the order of the target object from the beginning), or the order of the original sentence including the target object in a paragraph is counted, and the degree of attention of the target object word is evaluated by using a correspondence table between the position of a word and the degree of attention.

For example, the degree of attention is set according to the position of object data within an original text by using the correspondence table between the position of a word and the degree of attention as shown in FIG. 12C.

The reliability degree evaluating unit 16*f* calculates the degree of reliability to be possessed by fact data by using the degree of attention extracted as described above. Fundamentally, an evaluation algorithm is set so that the degree of reliability goes up as the degree of attention of a target object rises. By way of example, as shown in FIG. 12D, it is determined whether or not the degree of attention is higher than a threshold value $\alpha$, and the degree of reliability is set according to a result of the determination. For the text analysis at this time, which word is a subject or an object word, etc. is obtained by using an existing program.

As described above, an accurate correctness/incorrectness determination can be made by raising the degree of reliability of an object to which attention is paid with the use of the information of a modifying postpositional particle, the position of a target object within a text, etc.

FIG. 13 shows a third internal configuration of the reliability degree assigning unit. This example show the configuration in the case where the degree of reliability is evaluated according to the bibliographical information in the above described (3).

In FIG. 13, 11 is the data extracting unit extracting object data itself as described above, and 16 is the reliability degree assigning unit which receives as an input the bibliographical information (issuance source, author, etc.) possessed by a text, and examines the degree of reliability to be possessed by fact data with the use of a bibliographical information/reliability degree correspondence table 16*h*.

For example, the degree of reliability of a text is evaluated according to an issuance source, and a corresponding degree of reliability is assigned depending on whether or not the degree of reliability of the issuance source is high.

Hereinafter, explanation is provided with reference to the specific examples shown in FIGS. 14A through 14E. Assume that bibliographical information (issuance sources) corresponding to the descriptions of original texts are respectively "news office A", "news office B", and "new agency C" as shown in FIG. 14A, and their degrees of reliability are respectively set to be 0.6, 0.8, and 0.9 in the bibliographical information/reliability degree correspondence table 16*h* as shown in FIG. 14B. In this case, the reliability degree assigning unit 16 assigns the degree of reliability to each of the texts according to the bibliographical information/reliability degree correspondence table 16*h*, and the degree of reliability according to a news source is assigned to the object data output from the data extracting unit 11 as shown in FIG. 14C.

The above described data aggregating unit 12 shown in FIG. 3 aggregates the fact data assigned with the degree of reliability by the algorithm in the above described i) or ii), and passes the aggregated data to the inconsistency detecting unit 13. Since the representative of the company A is "B" and "D" among the fact data shown in FIG. 14C and an inconsistency exists, the inconsistency detecting unit 13 recognizes the representative of the company A "B" and "D" as inconsistent data, assigns the degrees of reliability, and outputs the fact data to the correctness/incorrectness determining unit 14 as shown in FIG. 14D.

The correctness/incorrectness determining unit 14 makes a correctness/incorrectness determination, for example, by using the algorithm in the above described i) or ii). By way of example, if the correctness/incorrectness determination is made by the algorithm in i) in which the data having the highest degree of reliability is selected to be correct and other data are recognized to be incorrect, the representative of the company A "B" is discarded as an error, and "D" is recognized to be correct and output to the data integrating unit 15. As a result, the data shown in FIG. 14F is output from the data integrating unit 15.

Figure 15:
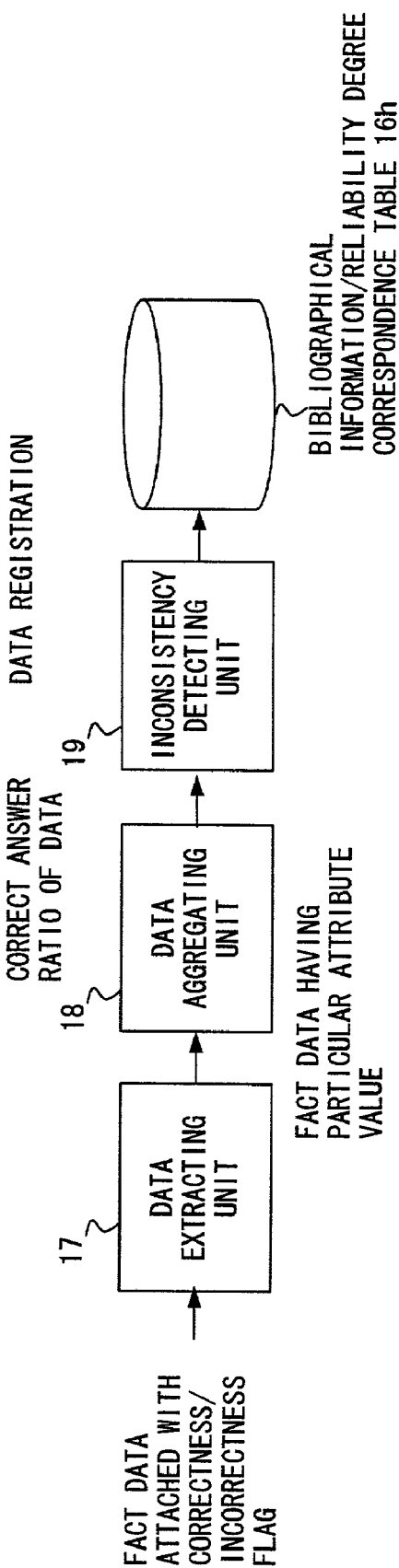
FIG. 15 exemplifies the configuration for generating a correspondence table between bibliographic information and the degree of reliability.

FIG. 15 exemplifies the configuration for generating the bibliographical information/reliability degree correspondence table 16*h* within the reliability degree assigning unit shown in FIG. 13.

In this figure, fact data to which a correctness/incorrectness flag is attached is input to a bibliographical information attribute scanning unit 17. The correctness/incorrectness flag indicates whether fact data is either correct or incorrect. This flag may be manually attached beforehand or automatically attached by a different system.

The bibliographical information attribute scanning unit 17 searches the whole of data for each attribute value of bibliographical information, etc., and extracts the fact data possessed by an attribute. Assume that the degrees of reliability of news sources such as the above described news office A, news office B, and news agency C are obtained. In this case, the whole of the data is searched for each of the news offices and news agency, and fact data to which a correctness/incorrectness flag is attached is extracted.

A reliability degree evaluating unit 18 calculates the correct answer ratio of the data based on the correctness/incorrectness flag for the fact data extracted by the bibliographical information attribute scanning unit 17, and obtains the degree of reliability for each bibliographical information. As a result, the respective degrees of reliability of, for example, the above described news offices A and B and news agency C can be obtained.

A data registering unit 19 registers the degrees of reliability obtained by the reliability degree evaluating unit 18 to the bibliographical information/reliability degree correspondence table 16*h*, and puts the degrees into a database.

By generating the bibliographical information/reliability degree correspondence table 16*h* as described above, the operation for manually registering data to a correspondence table can be eliminated.

FIG. 16 shows a third preferred embodiment according to the present invention. This preferred embodiment is intended to decide the determination method used by the correctness/incorrectness determining unit 14 by adding a determination method deciding unit 20 to the configuration shown in FIGS. 4 and 7. The other constituent elements are the same as those shown in FIGS. 4 and 7.

In FIG. 16, when an inconsistent data group is input to the correctness/incorrectness determining unit 14, the determination method deciding unit 20 first examines the target object and the attribute name of fact data. Then, the determination method deciding unit 20 references the bibliographical information/reliability degree correspondence table 21, and decides the method for a correctness/incorrectness determination. A target object, an attribute name, and a determination method according thereto are pre-registered to the the bibliographical information/reliability degree correspondence table correspondence table.

For example, if a plurality of persons corresponding to an attribute name such as a division director exist, a first determination method such as a method with which all of data having the degree of reliability that is equal to or higher than a threshold value is registered to the bibliographical information/reliability degree correspondence table correspondence table 21. Or, if only one person corresponding to an attribute name such as "president" exists, a second determination method with which only the data having the highest degree of reliability is determined to be correct is registered to the above described table. The determination method deciding unit 20 specifies the first determination method if an attribute name is a division director, or specifies the second method if an attribute name is a president.

The correctness/incorrectness determining unit 14 determines whether each data within a data group is either correct or incorrect with the correctness/incorrectness determination method specified by the determination method deciding unit 20.

By making a correctness/incorrectness determination as described above, a unique correctness/incorrectness determination can be made for data which can possess a plurality of values, such as a division director of a company, and data only allowed to possess a unique value such as a president.

Figure 17:
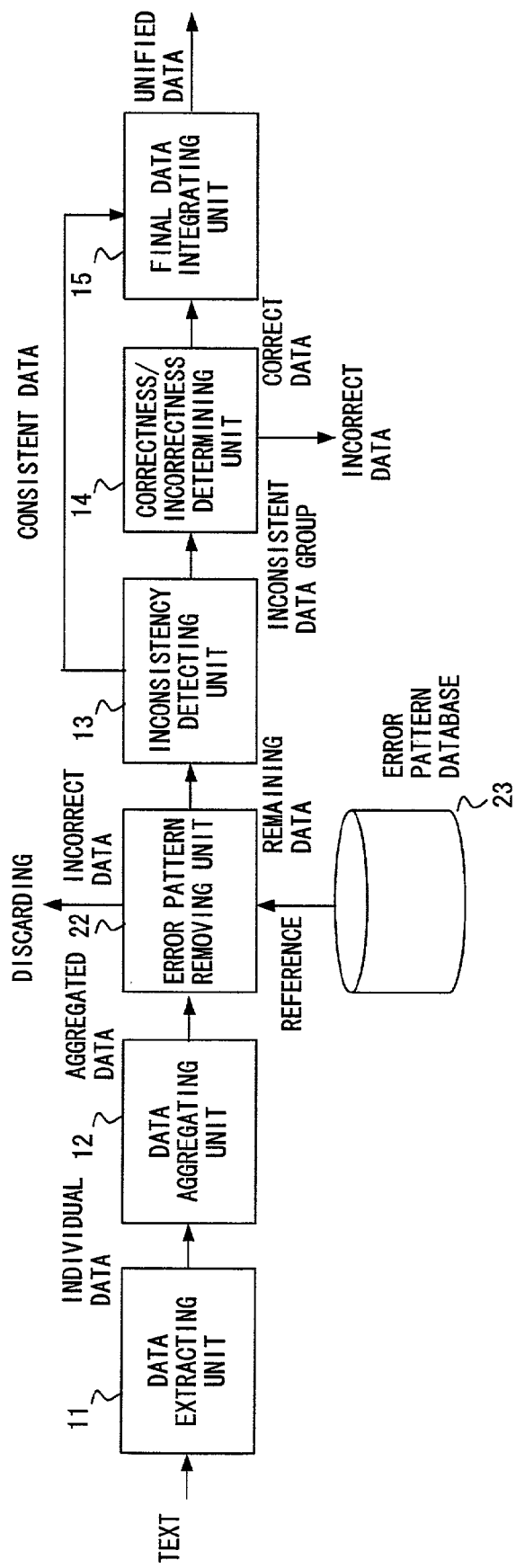
FIG. 17 exemplifies a fourth preferred embodiment according to the present invention.

FIG. 17 shows a fourth preferred embodiment according to the present invention. This preferred embodiment is intended to discard data determined to be incorrect as single data by adding an error pattern removing unit 22 to the above described first or the second preferred embodiment. The other constituent elements are the same as those shown in FIG. 4 or 7.

In FIG. 17, the error pattern removing unit 22 is arranged between the data aggregating unit 12 and the inconsistency detecting unit 13. The error pattern removing unit 22 discards data determined to be incorrect as single data by referencing an error pattern database 23, when the data is given from the data aggregating unit 12.

FIGS. 18A–18C exemplify an error pattern determination made by the error pattern removing unit 22 shown in FIG. 17. These figures show an example where an error is detected by stipulating a telephone number that does not begin with "0" as an error pattern of a telephone number.

For example, if the data extracted by the data extracting unit 11 are the telephone numbers of companies A and B as shown in FIG. 18A, the error pattern removing unit 22 references the error pattern database 23, and makes a comparison between the above described telephone numbers and the error pattern of telephone numbers.

Here, assume that the error pattern shown in FIG. 18B is registered to the error pattern database 23. FIG. 18B describes that a telephone number that does not begin with "0" is an error in a normal expression. Namely, the normal expression shown in FIG. 18B is a normal expression of a UNIX program for making a string matching, and "^" indicates the beginning, "[^0]" indicates a number which is not "0", and "[0–9]+" indicates a string of one or more numerals from 0 to 9. Here, the process for "–" is ignored.

Since the telephone number of the company B "119-0003" begins with a numeral other than "0", the error pattern removing unit 22 determines that this number is an error as a result of the comparison between the telephone numbers shown in FIG. 18A and the error pattern shown in FIG. 18B, and discards the telephone number of the company B.

FIG. 19 shows a fifth preferred embodiment according to the present invention. This preferred embodiment is intended to cope with representation fluctuations by arranging a data unifying unit to unify data having similar attribute values. The other constituent elements are the same as those shown in FIG. 7.

In FIG. 19, a data unifying unit 24 unifies data having similar attribute values by referencing a data fluctuations database 25. As a result, a correctness/incorrectness determination can be prevented from being erroneously made as if not so many representation fluctuations occur for each representation, although many representation fluctuations occur actually.

FIGS. 20A through 20C exemplifies the process performed in this preferred embodiment. When data shown in FIG. 20A is extracted by the data extracting unit 1, the data unifying unit 24 unifies data having similar attribute values.

A condition such that a name including a family name and a name having only a family name can be unified as similar data is assumed to be set as a unification condition of name data in the data fluctuations database 25 in this example. The data unifying unit 24 unifies the data having "Ichiro Yamada" as an attribute value of an attribute name "representative" of a company A and the data having "Yamada" under the above described condition by referencing the data fluctuations database 25. Consequently, the data of the attribute name "representative" of the company A are unified as shown in FIG. 20B, and the frequency of the data is set to be a total of the number of occurrences of both the data.

When the data are unified by the data unifying unit 24 as described above, a correctness/incorrectness determination is made according to the unified frequency by the correctness/incorrectness determining unit 14. Suppose that the correctness/incorrectness determination is made with the above described algorithm in which data having the maximum number of occurrences within a group is determined to be correct, and the others are determined to be incorrect. In this case, as the "representative" of the company A, "Taro Yamada" is determined to be correct, while "Taro Suzuki" is determined to be incorrect as shown in FIG. 20C.

Because the number of occurrences of "Taro Suzuki" is larger than the respective numbers of occurrences of "Ichiro Yamada" and "Yamada" in this example, "Taro Suzuki" is determined to be correct if data unification is not performed. However, a proper correctness/incorrectness can be made by performing the above described data unification.

As stated earlier, the following effects can be obtained according to the present invention.

(1) Fact data is extracted from a text, data of the same type among the extracted data are unified, a data aggregation is made throughout the text, an inconsistent data group which cannot be consistent is detected by scanning an aggregated data set, which data is correct is determined within the inconsistent data group, and correct fact data are unified by removing error data, whereby suitable data can be integrated by removing an error portion from the errors and fluctuations within extracted data, which are caused by an erroneous description within a text or an extraction process error.

(2) The degree of reliability is assigned to fact data when the data is extracted from a text, and whether each data within a data group is either correct or incorrect is determined by using the degree of reliability, whereby the accuracy of the correctness/incorrectness determination can be improved.

(3) A determination method used when a correctness/incorrectness determination is made is specified according to an attribute name, and the correctness/incorrectness determination is made by the specified determination method, whereby a flexible correctness/incorrectness determination can be made according to an attribute.

(4) A matching between extracted fact data and a pre-registered error pattern is made, and the extracted fact data is determined to be incorrect and is discarded when a match is found between the extracted data and the pre-registered error pattern, whereby it becomes possible to remove an error that can be determined alone.

(5) Similar data are unified, and inconsistency detection is made after the similar data are unified into one, whereby fluctuations caused by different expression of the same thing can be absorbed.

What is claimed is:

1. A fact data unifying apparatus, comprising:
a data extracting unit extracting from a text fact data stipulated by a combination of a target object, an attribute name, and an attribute value;
a data aggregating unit grouping data of a same type among fact data extracted by said data extracting unit, and aggregating a number of occurrences of the fact data throughout the text into at least one data set;
an inconsistency detecting unit detecting an inconsistent data group which cannot be consistent by scanning a data set aggregated by said data aggregating unit;
a correctness/incorrectness determining unit determining which data is correct within the inconsistent data group detected by said inconsistency detecting unit;
a final data integrating unit integrating correct data aggregated by said data aggregating unit, and data determined to be correct by said correctness/incorrectness determining unit;
a reliability degree assigning unit assigning a degree of reliability to fact data when the fact data is extracted from the text, where the degree of reliability of aggregated data is calculated from the degrees of reliability of the fact data included in the aggregated data, and assigned to an aggregation result, when the numbers of occurrences are aggregated by said data aggregating unit, said correctness/incorrectness determining unit determining whether each data within a data group is either correct or incorrect by using the degree of reliability assigned to the data.

2. The fact data unifying apparatus according to claim 1, wherein said reliability degree assigning unit comprises:
an event type extracting unit determining a type of event information possessed by a text from which fact data is to be extracted when the fact data is extracted from the text, and
a reliability degree evaluating unit evaluating the degree of reliability according to an event type based on a correspondence table between an event type and the degree of reliability.

3. The fact data unifying apparatus according to claim 1, wherein said reliability degree assigning unit comprises:
an attention degree evaluating unit calculating a degree of attention to a target object to be extracted within a text, and
a reliability degree evaluating unit evaluating the degree of reliability of data based on the degree of attention.

4. The fact data unifying apparatus according to claim 1, wherein said reliability degree assigning unit comprises:
a bibliographical information/reliability degree correspondence table making a correspondence between bibliographical information of at least one of an issuance source and an author of a text, and the degree of reliability of each of the fact data described in the text; and
a reliability degree evaluating unit evaluating the degree of reliability of a text according to bibliographical information of the text by referencing said bibliographical information/reliability degree correspondence table, when data is extracted from the text.

5. The fact data unifying apparatus according to claim 4, wherein said bibliographical information/reliability degree correspondence table is generated by attaching a correctness/incorrectness flag to fact data extracted by said data extracting unit, by receiving as an input the fact data to which the correctness/incorrectness flag is attached, and by calculating an expectation value of correctness/incorrectness of data having a particular attribute value for each attribute name of the fact data.

6. A fact data unifying apparatus, comprising:
a data extracting unit extracting from a text fact data stipulated by a combination of a target object, an attribute name, and an attribute value;
a data aggregating unit grouping data of a same type among fact data extracted by said data extracting unit, and aggregating a number of occurrences of the fact data throughout the text into at least one data set;
an inconsistency detecting unit detecting an inconsistent data group which cannot be consistent by scanning a data set aggregated by said data aggregating unit;
a correctness/incorrectness determining unit determining which data is correct within the inconsistent data group detected by said inconsistency detecting unit;
a final data integrating unit integrating correct data aggregated by said data aggregating unit, and data determined to be correct by said correctness/incorrectness determining unit;
an attribute/determination method correspondence table which makes a correspondence between a target object, an attribute name, and a determination method used when a correctness/incorrectness determination is made; and
a determination method deciding unit deciding a correctness/incorrectness determining method according to an attribute based on said attribute/determination method correspondence table, said correctness/incorrectness determining unit making a correctness/incorrectness determination by a method specified by said determination method deciding unit, when an inconsistent data group is input.

7. A fact data unifying apparatus, comprising:
a data extracting unit extracting from a text fact data stipulated by a combination of a target object, an attribute name, and an attribute value;
a data aggregating unit grouping data of a same type among fact data extracted by said data extracting unit, and aggregating a number of occurrences of the fact data throughout the text into at least one data set;
an inconsistency detecting unit detecting an inconsistent data group which cannot be consistent by scanning a data set aggregated by said data aggregating unit;
a correctness/incorrectness determining unit determining which data is correct within the inconsistent data group detected by said inconsistency detecting unit;
a final data integrating unit integrating correct data aggregated by said data aggregating unit, and data determined to be correct by said correctness/incorrectness determining unit; and
an error pattern removing unit, arranged between said data extracting unit and said inconsistency detecting unit, making a correctness/incorrectness determination for each data by making a matching between the fact data extracted by said data extracting unit and a pre-registered error pattern, determines and discards the extracted fact data as an error if the extracted fact data matches the pre-registered error pattern, and transmits only data determined to be correct to said inconsistency detecting unit.

8. A fact data unifying apparatus, comprising:
a data extracting unit extracting from a text fact data stipulated by a combination of a target object, an attribute name, and an attribute value;

a data aggregating unit grouping data of a same type among fact data extracted by said data extracting unit, and aggregating a number of occurrences of the fact data throughout the text into at least one data set;

an inconsistency detecting unit detecting an inconsistent data group which cannot be consistent by scanning a data set aggregated by said data aggregating unit;

a correctness/incorrectness determining unit determining which data is correct within the inconsistent data group detected by said inconsistency detecting unit;

a final data integrating unit integrating correct data aggregated by said data aggregating unit, and data determined to be correct by said correctness/incorrectness determining unit; and a data integrating unit, arranged after said data aggregating unit, integrating similar data into integrated data and supplying the integrated data to said inconsistency detecting unit.

* * * * *